United States Patent [19]  [11] 3,904,457
Laughlin  [45] Sept. 9, 1975

[54] METHOD OF ULTRASONIC BUTT SPLICING REINFORCED TIRE FABRIC
[75] Inventor: William Patrick Laughlin, Akron, Ohio
[73] Assignee: The Firestone Tire & Rubber Company, Akron, Ohio
[22] Filed: Sept. 12, 1974
[21] Appl. No.: 505,413

Related U.S. Application Data
[63] Continuation of Ser. No. 222,595, June 7, 1972, abandoned.

[52] U.S. Cl. ............... 156/73.4; 228/110; 156/304
[51] Int. Cl.² ..................... B29C 27/08; B23K 1/06
[58] Field of Search ......... 156/73.1, 73.4, 580, 380, 156/304, 502; 228/1, 110; 29/470, 470.3

[56] References Cited
UNITED STATES PATENTS
2,626,430  1/1953  Dawson ............................ 156/73.1
3,331,719  7/1967  Soloff ................................ 156/304
3,483,073  12/1969  Pounder et al. ................... 156/304
3,519,507  7/1970  Pierson ............................. 156/304
3,666,602  5/1972  Obeda .............................. 156/73.4
3,725,164  4/1973  Albinger et al. .................. 156/502

FOREIGN PATENTS OR APPLICATIONS
33-9142  10/1958  Japan ............................... 156/73.1

OTHER PUBLICATIONS
Frederick, J. R., Ultrasonic Engineering, N.Y., J. Wiley, 1965, p. 170, 171, 190–193, TA367F12.

Primary Examiner—Douglas J. Drummond

[57] ABSTRACT
This disclosure relates to a method of joining the edge of one vulcanizable rubber skim coated reinforcing fabric to the edge of another. The method comprises placing the edges of the rubber skim coated reinforcing fabrics contiguous to one another and subjecting these contiguous edges to ultra-sonic energy thereby causing the edges of the rubber skim coating to adhere to one another and form a strong bond or splice between the two fabrics.

1 Claim, 2 Drawing Figures

PATENTED SEP 9 1975

3,904,457

METHOD OF ULTRASONIC BUTT SPLICING REINFORCED TIRE FABRIC

This is a continuation of application Ser. No. 222,595, filed June 7, 1972 now abandoned.

BACKGROUND OF THE INVENTION

This invention relates to a method for splicing the edges of rubber skim-coated reinforcing fabrics to one another. This is the type of fabric ply that is commonly used in the rubber industry to provide strength and reinforcement to rubber end products. The ply contains a fabric or parallel reinforcing cords onto each side of which has been calendered a layer of a vulcanizable rubber skim. It has been the practice in the past to splice the edges of such rubber-coated fabric with either a butt splice construction or a lap splice construction.

As the lap splice construction infers, a portion of the edge of each end of the rubber fabric overlaps the other edge and pressure is applied which results in a strong union. In this splice the strength is the result of the large effective area (due to the overlapped fabrics) present in the splice area.

Also, as the name infers, in a butt splice there is no overlap of the edges of the rubber coated fabric and the union of the pieces is all accomplished merely by bringing the edges of the pieces together and applying pressure to the splice area. The strength of this splice depends solely upon the bond between the edges of the rubber skim coating.

The lap splice construction is the preferred method, when possible, as it forms a stronger splice.

The lap splice is feasible when the cord in the reinforcing fabric is of a synthetic fibrous material; however, it is not feasible when the cord is of an inextensible material such as steel or glass or when a synthetic fibrous cord has a large diameter. The inherent stiffness or mere bulk of these cords makes lap splices impractical either by reason of the fact that the splice simply won't hold during the severe strain demanded during expansion of a tire or that the bulk of material in the splice area causes an out of balance condition in the finished tire.

The specific application to which the present method is particularly applicable is the butt splicing of rubber coated tire reinforcing fabric in which the reinforcing cords are either steel, glass, or a synthetic fabric whose cord diameter prohibits the lap splicing technique; specifically, the steel or wire type fabric.

In tire manufacturing, the tire is assembled on a flat, cylindrical building drum. The reinforcing plies are applied to this building drum in layers. The cords in each reinforcing ply are located at a predetermined angle to the circumferential axis of the tire. The reinforcing plies, prior to their application on the building drum, undergo two manufacturing steps. Firstly, a rubber skim is calendered onto both sides of the fabric and, secondly, the calendered fabric is cut laterally across its width into pieces. This cut is made either on a bias relative to the cords in the calendered fabric (when an angle is desired in the final fabric) or perpendicular to the cords (when the fabric is desired for the body of a radial ply tire). The edge portion of the original fabric in these laterally cut pieces are spliced to each other so that the cords in this finished, continuous piece or ply are at a predetermined angle to the longitudinal direction of the fabric. It is in the splicing of the ends of the laterally cut pieces of calendered fabric that the process of this invention is particularly beneficial. As a finished tire may contain several layers of reinforcing plies, several of these type splices may be present in one tire.

Further in the process of manufacturing a tire, the reinforcing plies undergo a very high degree of expansion. This expansion occurs in the tire shaping step in which the tire is expanded from an open-ended cylinder shape into the traditional toroidal tire shape. During this expansion process the splices in the rubber coated tire reinforcing fabric plies undergo high stresses and separations may occur where the strength of the splice is not sufficient to withstand the pressures of this tire expansion. These separations are particularly troublesome in tires in which the plies have been butt spliced; and more particularly in steel cord reinforced tires.

An object of this invention is to provide a butt splicing method which results in a splice with sufficient strength to withstand the high pressures in tire expansion, particularly with a rubber coated steel cord fabric.

In the prior methods of butt splicing steel or wire cords, in order to insure a satisfactory splice, it has been necessary to have a fresh, bevel cut edge of the rubber skim coating on each of the ply edges to be joined. When the angle of the cords in the ply is 90° in relation to the plies longitudinal direction (that is, the cords are parallel to the edge to be spliced), this fresh, bevel cut edge of the rubber skim coating was obtained by removing the last wire and bevel cutting the resulting overhanging rubber skim with a hot knife. In bias cut rubber coated fabric where the cords form an angle of less than 90° in relation to the plies longitudinal direction (that is, the cords also form an angle with the edge of the rubber coated fabric that is to be spliced), ths surface of the overhanging rubber must also be freshly, bevel cut with a hot knife. These methods are expensive and time consuming and in some cases resulted in the loss of two wires for each splice.

It is an object of the present invention to eliminate this expensive and time consuming use of a hot knife to bevel cut the edge of the rubber skim coating. It is an object of the present invention to provide a fast, economical method of butt splicing rubber coated steel cord tire reinforcing fabric.

It is a further object of this invention to provide an adequate splicing method for tire reinforcing plies which have a trimmed unheated edge.

SUMMARY OF THE INVENTION

The method of this invention fulfills the need of providing a butt splice technique that can be utilized to obtain a strong splice with rubber coated steel cord tire reinforcing fabrics. The invention eliminates the necessity to bevel cut the rubber skim coating at the ply edges with a hot knife and eliminates the removal and resultant loss of the end wires at the ply edges when it is desired to splice the fabric.

The method of this invention comprises bringing together in contiguous relationships the two trimmed unheated edges to be spliced and subjecting this contiguous area of the fabrics to pressure and to ultra-sonic impulses. The ultra-sonic impulses produce heat in the splice area. This heat causes the rubber skim coating in the splice area to soften and produces what is believed to be a homogenizing effect at the interfaces of the rubber in the splice area which results in a strong, efficient splice that had adequate strength to withstand the expansion pressures that are present in the further steps in tire manufacture. These ultra-sonic impulses are obtained by utilizing a standard ultra-sonic generating assembly. By way of example, this ultra-sonic assembly is comprised of a power source, a converter which changes the electrical energy of the power source into mechanical energy, a booster which increases the magnitude of this energy, and sonic horns which vibrated to give sonic impulses. These horns are the specific means for transmitting the sonic impulses to the pieces to be spliced; they may be characterized as tuning forks which vibrate at a certain frequency and amplitude.

The efficiency of the sonic impulses generated by the sonic horns is a function of several factors, such as the size of the power supply, the frequency of the vibration of the sonic horns, and the amplitude of the movement of the sonic horns. It is well known that the frequency of the vibrations and the amplitude of the vibrations are inversely proportional to one another; that is, as the degree of movement (amplitude) occurring in the horns increases, the frequency of the vibrations of the horns decreases. It is also known that the greater the amplitude of the sonic horns, the greater the hysteresis loss of the horns and, therefore, the greater the amount of heat that is generated by the sonic impulses.

This technique of utilizing ultra-sonic impulses to splice thermoplastic materials has been utilized with very thin plastic films. Its use with materials of the thickness of tire reinforcing fabrics has been thought to be unworkable. The thickness of these plastic films has been on the order of a few thousandths of an inch or at most a few hundreds of an inch, whereas the tire reinforcing fabric plies utilized in this invention are on the order of one tenth of an inch and over. It has been verified that this ultra-sonic splicing method is unsatisfactory with rubber of the thickness in the same range as the tire reinforcing fabric. It is believed that the presence of the cords in the tire reinforcing fabrics assists in the transmission of the sonic impulses so that the entire thickness of the tire reinforcing fabric ply is subjected to the activation of the sonic impulses. In rubber pieces which do not contain the reinforcing cords (such as tire tubes) the ultra-sonic splicing technique is not satisfactory.

In the method of this invention the sonic horns are placed in direct contact with the pieces to be spliced and thereby, when actuated, due to the ultra-sonic vibrations of the horns, cause a generating of heat in the splice area of the fabric plies which softens and homogenizes the rubber skim coatings thereby forming a strong bond or splice.

The splices resulting from this method are very strong and are obtained very economically. It is not necessary to pretreat the edges of the fabric plies to be spliced; it is only necessary to bring the edges into contiguous relationship, to contact the area to be spliced with the sonic horns, to apply pressure to the splice, and to subject the splice to sonic impulses by actuating the sonic horns. The actual time necessary after the actuation of the sonic horns until an adequate splice is obtained is a matter of fractions of a second or mere seconds. Therefore, the expensive, time consuming process of preparing the ply edges to be spliced by removing the outer wire and bevel cutting the rubber skim coating is completely eliminated, as is the necessity to apply pressure stitching means to the splice area after the splice has been made. In the method of this invention the sonic horns themselves are used as the means of applying pressure to the splice area, thereby eliminating any post-stitching of the splice area.

In the application of the method of this invention it is necessary that the sonic horns contact and apply uniform pressure to the ply edges to be spliced over the entire area to be spliced. There can be no variation in the amount of pressure applied to these edges. It is necessary to provide the apparatus for this method with a means for applying variable pressure in the splice area so that irregularities in the fabric plies may be compensated for.

The amount of pressure applied by the sonic horns is important in that it has relationship to the amount of sonic impulses that are effectively generated into the pieces to be spliced. If the pressure is too great it may smother the sonic vibrations of the sonic horns and decrease the effectiveness of these vibrations. Likewise, if the pressure is too small, the contact between the sonic horns and the pieces to be spliced may be inefficient and result in the loss of sonic vibrations (and, therefore, heat) by this inefficient contact.

The frequency of the ultra-sonic vibrations is governed on the low side of the range by the fact that the vibrations must be high enough to eliminate any unpleasant conditions or side effects on the workman operating the apparatus and, further, that the vibrations must be high enough to generate the necessary amount of impulses to cause the heating and resulting softening and homogenizing of the rubber skim coating in the splice area. The range of the sonic vibrations is limited on the high side by the economics of providing the necessary power to obtain the energy required for the production of the vibrations, by the physical nature of the materials used in the horns which must tolerate the vibrations, and further by the fact that the amplitude of the horns must be large enough to transmit the vibrations through the upper layer of the rubber skim coating and the sandwiched reinforcing fabric to the lower layer of the rubber skim coating.

DETAILED DESCRIPTION

Figure 1:
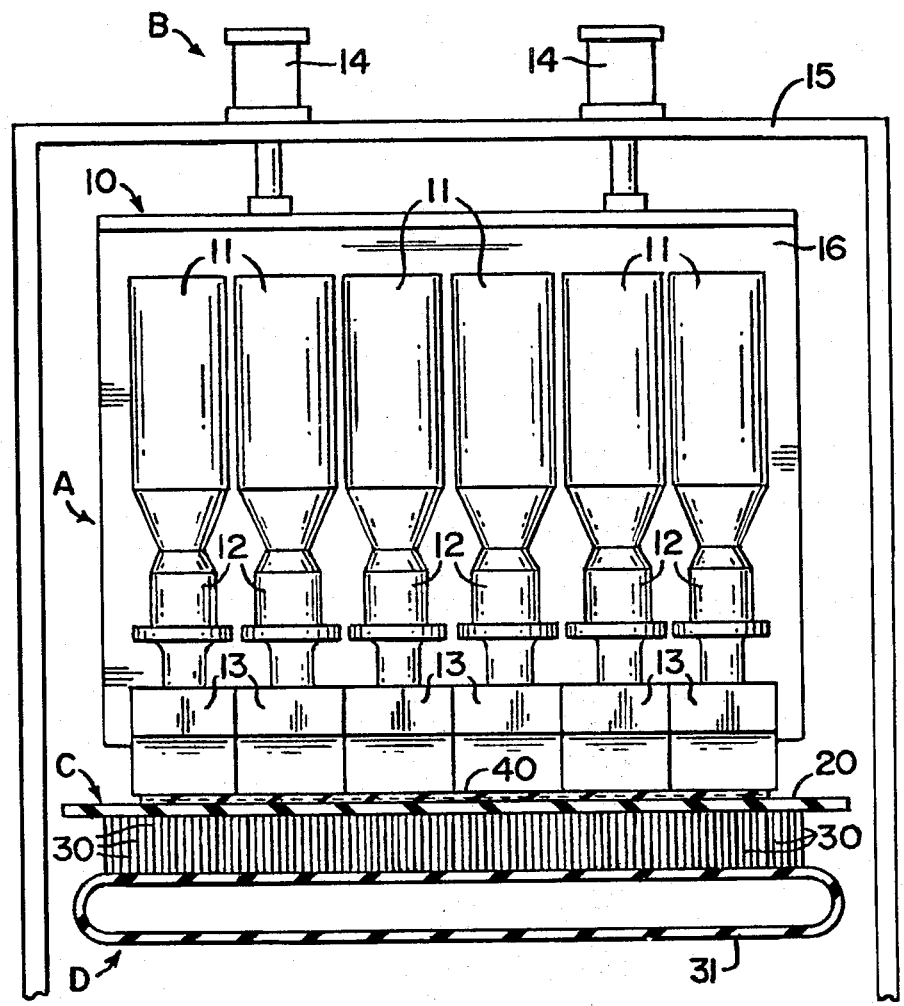
FIG. 1 is a frontal view of the apparatus that is utilized in the process of this invention.

In FIG. 1, the basic apparatus consists of four parts; the sonic impulse generating means (six shown by way of example), depicted as A; the means for bringing the sonic impulse generating means into contact with the pieces to be spliced, depicted as B; the means for bringing the edges of the fabric plies to be spliced into contiguous relationship with each other, such as a conveyor belt, depicted as C; and a means to optimize the pressure on the pieces to insure that the pressure applied by the sonic impulses generating means is uniform throughout the contact area of the sonic impulse generating means and the fabric ply edges to be spliced, depicted as D.

In FIG. 1, six separate sonic impulse generating means are mounted on piece 10. This means is comprised of a power supply (not mounted on piece 10 and not shown) which may be a 2,000 volt sequencer. This power is connected to the converter, 11, of each separate sonic impulse generating assembly so that it may fire each assembly individually. The converters, 11, so connected to the power supply, change the electrical energy into mechanical vibrational energy and, are, in turn, connected to boosters, 12, which increase or amplify the mechanical vibrational energy realized from the converters. The boosters are in turn connected to sonic horns, 13, which transmit the mechanical vibrational energy realized in amplified form from the boosters into sonic energy in the form of vibrations or impulses at a certain predetermined frequency and amplitude. This frequency and amplitude of the horns is determined by the configuration of the horns and the strength of the power supply.

The means B may be any of many mechanical devices, such as hydraulic or pneumatic actuated cylinders and rams, to provide movement for the sonic horns of sonic impulse generating means. FIG. 1 depicts one such means which is comprised of air cylinders and rams, 14, with a 2-inch stroke, mounted on stationary support beams, 15, and connected to vertically moveable piece, 16. This vertically moveable piece is allowed to move in a predetermined manner by guide means (not shown) so that the sonic impulse generating assemblies which are mounted thereon will move up and down in a predetermined vertical relationship to the entire splicing assembly and the piece to be spliced. The air cylinders also impart a predetermined pressure to the piece 16 so that the sonic horns apply a predetermined pressure to the pieces to be spliced.

The means C which delivers the pieces to be spliced to the sonic impulse generating means in FIG. 1 is shown as a conveyor belt, 20, and is located between the sonic impulse generating means A and the variable pressure means D.

The pressure optimizing means D is depicted in FIG. 1 as multi-file plates, 30, supported by an air bag, 31. These plates are independent of each other and are free to react to the pressure applied to them from the top by the sonic impulse generating means. The supporting air bag absorbs the pressure and insures its distribution is uniform throughout the contact area.

Figure 2:
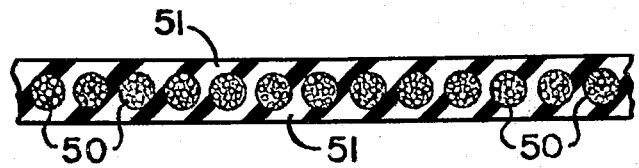
FIG. 2 is a cross-sectional view of the type of tire reinforcing fabric that has been spliced by the method of this invention.

In FIG. 2, the cross-section of a tire reinforcing fabric ply shows the reinforcing cords, 50, of the fabric covered by the rubber skim coating, 51. The material in the reinforcing cords may be any of the standard rubber reinforcing materials, such as rayon, nylon, polyester, steel, or glass. This method is particularly suited to splicing tire reinforcing plies in which the reinforcing material is of an inextensible nature, such as steel wire or glass. The rubber skim coating may be any of the standard vulcanizable rubber compounds used in the manufacture of rubber-fabric reinforced articles, such as tires and conveyor belts. The compound may be comprised of any of the synthetic rubbers or natural rubber or any combinations thereof. The thickness of this coating may be of uniform thickness on each side of the reinforcing cords or may be off balance with a greater thickness on one side of the cords than on the other.

In the practice of the process of this invention the tire reinforcing plies to be spliced are placed on the conveyor belt, 20. The edge of the plies to be spliced are brought into contiguous relationship and are positioned directly underneath the sonic horns, 13, between the horns and the conveyor belt. FIG. 1 depicts plies, 40, in this location. The sonic impulse generating means is lowered into contact with the ply edges by means B. Pressure is applied to the edges of the plies by the sonic impulse generating means when such contact is made. This pressure is uniformly applied in the entire splice area by the reaction of the means D, which comprises multi-file plates supported by an air bladder so that the plates may assume different heights depending upon the pressure applied to them by the lowering of the sonic means.

With the assembly so positioned, the sonic impulse generating means is activated to impart sonic vibrations to the pieces to be joined together. These sonic impulses are of a predetermined frequency and amplitude and for a predetermined time. Heat is generated by these impulses which is imparted to the rubber skim coatings in the contact area causing them to soften and flow. The rubber in this condition in each piece, under the pressure applied by the sonic horns, flows and joins with the rubber in the other piece thereby homogenizing the rubbers in both pieces with each other. The splice so formed between the two pieces is very strong and does not come apart during the manufacture of a tire. It is also formed in a very fast and economic manner relative to the prior methods of attaining splices in this type of reinforcing fabric.

The sonic energy generated by the sonic means must be great enough to pass completely through the upper rubber skim coating and the cords of the reinforcing fabric to reach the lower rubber skim coating so as to result in a heating of both the upper and the lower layers of rubber skim coating and in a homogenization of both of these layers with the corresponding layers in the other ply edge.

Specifically, the method of this invention has been demonstrated by splicing together two pieces of a standard, rubber skim coated reinforcing fabric ply that is utilized as the reinforcing plies in a steel cord tire. This specific fabric comprised parallel cords of steel cable, each cable having a 5 × 7 cable construction and a diameter of 0.059 inches. The cables were so spaced to provide 16 such cables per inch. The rubber skim coating was unbalanced at .032 inches on one side and .052 inches on the other side of this steel cord making the total thickness of the piece (the sum of the thickness of the steel cord cable and the two layers of the rubber skim coating) .109 inches. Two such pieces were joined by the method of this invention by utilizing the assembly depicted in FIG. 1. The power was directed to each of the six sonic impulses generating assemblies separately, in series, which resulted in sonic impluses having a frequency of 20,000 cycles per second (20 Hertz) and am amplitude of .00175 inches being applied to the pieces. The pieces were subjected to such impulses for 0.7 seconds by each sonic impulse generating assembly. There was a time lag of 0.3 seconds between each such separate sonic assembly so that the six assembly unit took 6 seconds to accomplish the complete splice. The pressure applied by the sonic horns was 90 p.s.i. It is necessary to maintain the pressure applied by the sonic horns at an optimum level as too high a pressure will cause a smothering effect on the vibrations of the sonic horns, whereas too low a pressure will result in an inefficient contact between the sonic horns and the pieces to be spliced. The splice between the two pieces was very strong and was accomplished economically at a fraction of the time previously necessary.

From this disclosure, it is inherently obvious to one skilled in the art that the faces of the sonic horns in contact with the plies must rest on some of the reinforcing cords in the plies. If the sonic horns do not rest on the reinforcing cords, the only position the horns could take would be to pass between the cords at the ply edges. It would be impossible to accomplish a splice under such a condition due to the pressure used (90 psi in the example) and the soft nature of the rubber compound to be joined. In such a condition, the process would act as a cutting operation, not a splicing operation.

In the example just given, each ply had 16 cords per inch so each cord has a space of one sixteenth of an inch or .0625 inches. The face of the sonic horns would have to be .0035 inches or less in order for the horns not to rest on some of the reinforcing cords; that is, the space for each cord is .0625 inches and each wire has .059 inches diameter leaving .0035 inches left for the rubber compound (.0625 − .059 = .0035 or one two-hundred-eighty-sixth of an inch). With a face this narrow applied at 90 p.s.i. the face would pass completely through the soft rubber at the ply edges cutting and separating the plies, not joining them.

In the example the face of the sonic horns was five-eighths inches or .625 inches wide. This meant the sonic horns will rest on approximately 10 cords, five on either side of the ply edges.

Due to these inherent features in the method of this invention, it is obvious to one of ordinary skill in the art that the rubber compound at the edges to be joined must be trapped laterally between the parallel reinforcing cords in each ply closest to the ply edges and vertically between the faces of the sonic horns and the conveyor belt supported by the pressure distributing and optimizing means. This may be thought of as a chamber defined by these structures in which the rubber compound is trapped to undergo the sonic treatment.

It is understood that the sonic generating means may be of any of the known constructions that are available to produce sonic vibrations. The sonic horns can be of any form or configuration. Also any number of sonic impulse generating assemblies may be placed in series depending on the width of the pieces to be spliced and, any number of power supply sources may be used to actuate such assemblies when an even shorter time is required to complete the entire splice.

The means B and C may be any of the known mechanical equivalents that perform the function of joining the fabric ply edges to be spliced together and assuring the uniform pressure throughout the splice area.

The method of this invention may be utilized with any known, standard fabric regardless of the nature of the rubber skim coating and the nature of the fabric reinforcement.

Having thusly described the specific features of the invention, the scope of the invention is broad enough to cover any of the mechanical equivalents that may be employed to accomplish the same process.

I claim:

1. The method of butt splicing the edges of rubber compound coated tire type reinforcing fabric plies to one another in which the reinforcing cords of said fabric are parallel to each other and to said ply edges with the cords in each ply parallel to the cords in the other ply and in which said reinforcing fabric consists of inextensible cords selected from the group consisting of steel wire and glass cords, in which the rubber in said rubber compound is unvulcanized or not cross-linked and is selected from a group consisting of natural rubber and synthetic rubbers which comprises the steps of bringing said edges of said unvulcanized rubber compound into contiguous relationship, contacting said edges directly with an ultra-sonic generating means, applying pressure to said edges, distributing said pressure uniformly on said edges with a pressure optimizing means without substantially decreasing the ply thickness at the ply edge thereby trapping the rubber compound at said ply edges in a chamber defined by several parallel cords in each ply closest said ply edge, said ultra-sonic generating means and said pressure applying means and subjecting said edges to ultra-sonic vibrations by actuating said ultra-sonic generating means thereby heating the rubber compound at said ply edges which causes said rubber compound to flow and to homogenize to give a strong splice yet does not cause said rubber to cross-link or vulcanize.

* * * * *

UNITED STATES PATENT OFFICE
CERTIFICATE OF CORRECTION

Patent No. 3,904,457　　　　　　　Dated September 9, 1975

Inventor(s) William Patrick Laughlin

It is certified that error appears in the above-identified patent and that said Letters Patent are hereby corrected as shown below:

Column 1, line 13 "or" should read --of--

Signed and Sealed this tenth Day of February 1976

[SEAL]

Attest:

RUTH C. MASON
*Attesting Officer*

C. MARSHALL DANN
*Commissioner of Patents and Trademarks*